United States Patent
Dittrich et al.

(10) Patent No.: US 7,269,606 B2
(45) Date of Patent: Sep. 11, 2007

(54) AUTOMATIC REDUCTION OF TABLE MEMORY FOOTPRINT USING COLUMN CARDINALITY INFORMATION

(75) Inventors: Jens-Peter Dittrich, Heidelberg (DE); Olaf Meincke, Heidelberg (DE); Guenter Radestock, Karlsruhe (DE); Andrew Ross, Altrip (DE)

(73) Assignee: SAP AG, Walldorf, DE (US)

( * ) Notice: Subject to any disclaimer, the term of this patent is extended or adjusted under 35 U.S.C. 154(b) by 455 days.

(21) Appl. No.: 10/789,370

(22) Filed: Feb. 26, 2004

(65) Prior Publication Data
US 2005/0192998 A1    Sep. 1, 2005

(51) Int. Cl.
*G06F 12/00* (2006.01)
(52) U.S. Cl. .................... 707/200; 707/101
(58) Field of Classification Search ............... 707/101, 707/102
See application file for complete search history.

(56) References Cited

U.S. PATENT DOCUMENTS

| | | | | |
|---|---|---|---|---|
| 5,588,099 | A * | 12/1996 | Mogilevsky et al. | 715/508 |
| 7,058,646 | B1 * | 6/2006 | Loboz et al. | 707/101 |
| 7,076,507 | B1 * | 7/2006 | Tarin | 707/200 |
| 2001/0000536 | A1 * | 4/2001 | Tarin | 707/102 |

OTHER PUBLICATIONS

Joachims, Learning to Classify Text Using Support Vector Machines. Dissertation, Cornell University, Department of Computer Science, Kluwer Academic Publishers, May 2002.

Vivisimo® Clustering Engine, *Content Integrator*, http://www.vivisimo.com.
Vivisimo® Clustering Engine, *Clustering Engine*, http://www.vivisimo.com.
Yang, et al., "A re-examination of text categorization methods", *Proceedings of ACM SIGIR Conference on Research and Development in Information Retrieval*, SIGIR, 1999, pp. 42-49.
Joachims, "Text Categorization with Support Vector Machines: Learning with Many Relevant Features", Machines Learning: ECML-98, Proceedings of the 10th European Conference on Machine Learning, Apr. 1998, Chemnitz, Germany, pp. 137-142.
Salton, et al., "A Vector Space Model for Automatic Indexing", *Journal of the American Society for Information Science*, vol. 18, No. 11, Nov. 1975, pp. 613-620.

(Continued)

*Primary Examiner*—Don Wong
*Assistant Examiner*—Angela M Lie
(74) *Attorney, Agent, or Firm*—Mintz, Levin, Cohn, Ferris, Glovsky and Popeo, P.C.

(57) ABSTRACT

In a business system, one or more methods can be used to reduce an amount of redundancy in the storage of data. One implementation includes a method of reducing a memory footprint of a database table having multiple rows and one or more columns, in which each of the one or more columns has a cardinality, and the cardinality is a total number of different values in the rows of each column. The method includes comparing the cardinality with a total number of possible values in the rows of at least one column based on a width of the column. The method also includes reducing the width of the column if the cardinality is less than a threshold based on the total number of possible values in the rows of the column.

10 Claims, 5 Drawing Sheets

OTHER PUBLICATIONS

Witten, et al., *Managing Gigabytes. Compressing and Indexing Documents and Images*, Second Edition, Morgan Kaufmann Publishers, San Francisco, California, USA, 1999.

Joachims, Learning to Classify Text Using Support Vector Machines, Dissertation, Cornell University, Department of Computer Science, Kluwer Academic Publishers, May 2002.

* cited by examiner

| Memory Required (Bits) | Column | Dictionary |
|---|---|---|
| Original 1 | $n * w1$ | $m1 * k1$ |
| Original 2 | $n * w2$ | $m2 * k2$ |
| Combined 12 (Worst Case) | $n * (w1 + w2)$ | $m1 * m2 * (w1 + w2)$ |
| Combined 12 (Best Case) | $n * wm$ | $mm * (w1 + w2)$ |

Key

| | |
|---|---|
| n | Number of Rows in Original Columns (and in Original Table) |
| wj | Width of Column j in Bits (Minimized as in Method 100, Fig. 1A) |
| mj | Cardinality of Column j (i.e., Number of Different Values in Column j) |
| kj | Width of Widest Value in Column j in Bits (Typically, kj>wj) |
| mm | Maximum of m1 and m2 (i.e., Larger of the Two Values) |
| wm | Maximum of w1 and w2 (i.e., Larger of the Two Values) |

FIG. 3

AUTOMATIC REDUCTION OF TABLE MEMORY FOOTPRINT USING COLUMN CARDINALITY INFORMATION

BACKGROUND

The following description relates to reducing an amount of data in memory to allow for more efficient use and storage of data. In particular, the following description relates to reducing redundant data in repositories and databases.

Companies oftentimes store large amounts of data. The data can consume significant information technology resources of a business. For example, businesses may need to spend a portion of their resources on computers for workers, servers, databases, and systems to store the data. Businesses may have to allocate resources and personnel for the management of the data, and the ability to turn their data into useful organizational knowledge.

Certain amounts of business data are redundant. For example, companies often store large volumes of business data in relational database tables (e.g., fact tables). However, these fact tables often include interdefined or interrelated columns that occupy more memory space than required for the data they contain. The data redundancy has the consequence that application components, such as search engines working with the fact tables, can require more time and memory than necessary to obtain their results. If the amount of redundant data can be reduced and/or structured in such a way that the amount of available data can be used (or reused) more efficiently, then businesses can reduce the costs of storing and managing the data.

SUMMARY

In one implementation, the present disclosure relates to a method of reducing a memory footprint of a database table having multiple rows and one or more columns. Each of the one or more columns has a cardinality, in which the cardinality is a total number of different values in the rows of each column. The method includes comparing the cardinality with a total number of possible different values in the rows of at least one column based on a width of the column. The method also includes reducing the width of the column if the cardinality is less than a threshold based on the total number of possible values in the rows of the column.

In another implementation, the disclosure describes a method to reduce an amount of memory associated with information in a database table having multiple rows and one or more columns, in which the information relates to at least two columns. The method includes determining respective values in the columns in a memory and determining whether the respective values are interdependent. Upon determining an interdependency, the method includes generating a combined column based on at least two columns, in which the combined column includes the respective values in the columns. Upon generating the combined column, the (at least two original) columns are deleted from memory. The method may include writing dictionaries for the columns, and using the dictionaries for the respective columns to write a combined dictionary. The combined column may be generated based on the dictionaries. If there is a functional dependency between respective values in the original columns, there may be a reduction in the memory footprint when comparing the original columns memory footprint to the footprints of the combined column and dictionary.

In another aspect, an article includes a machine-readable medium storing instructions operable to cause a machine to perform operations. The operations include reducing a memory footprint of a database table having multiple rows and one or more columns. Each of the one or more columns has a cardinality, in which the cardinality is a total number of different values in the rows of each column. The operations include comparing the cardinality with a total number of possible values in the rows of at least one column based on a width of the column. The operations also include reducing the width of the column if the cardinality is less than a threshold based on the total number of possible values in the rows of the column.

The systems and techniques described here may provide one or more of the following advantages. For example, the current disclosure can permit a business to reduce an amount of redundancy in its data to bring performance benefits, such as allocating a smaller amount of resources (e.g., equipment, personnel, money, facilities) for storing and managing data that may have redundancies. Reducing data redundancy can also improve the speed of business processes, such as an amount of network traffic or an amount of time required to conduct searches in one or more databases. Redundancy reduction may be performed automatically (e.g., without human interaction). The systems and techniques may provide insight for one or more users of the data for improving the data schema (e.g., the structure of a database system, usually with tables, fields in each table, and relationships between the fields and tables).

The details of one or more implementations are set forth in the accompanying drawings and the description below. Other features and advantages will be apparent from the description and drawings, and from the claims.

DRAWING DESCRIPTIONS

FIG. 3 shows estimates of memory footprints for the method of FIG. 2A.

Like reference symbols in the various drawings may indicate like elements.

DETAILED DESCRIPTION

The present disclosure describes systems, methods, and techniques in which a business can reduce an amount of redundant data in a database. In general, information about the cardinality of the columns in a fact table can be used to exploit interdependencies between the columns in order to reduce the table memory footprint. In particular, two data-reducing methods are described. In a first method, the width of individual table columns can be reduced to a minimum number of bits, in which the minimum width in bits of a column is the least integer greater than or equal to the logarithm to the base two of the cardinality of the column. In a second method, at least two columns can be merged pairwise to reduce memory space. If respective values in two columns are interdependent, the second method uses this property to save or reduce memory space. Also, the technique presented here for combining columns pairwise can be generalized to combine n columns (e.g., multiple columns) into a single column. If there are many functional dependencies between the columns, the combining process can result in a dramatic reduction in the memory footprint of the table.

Figure 1A:
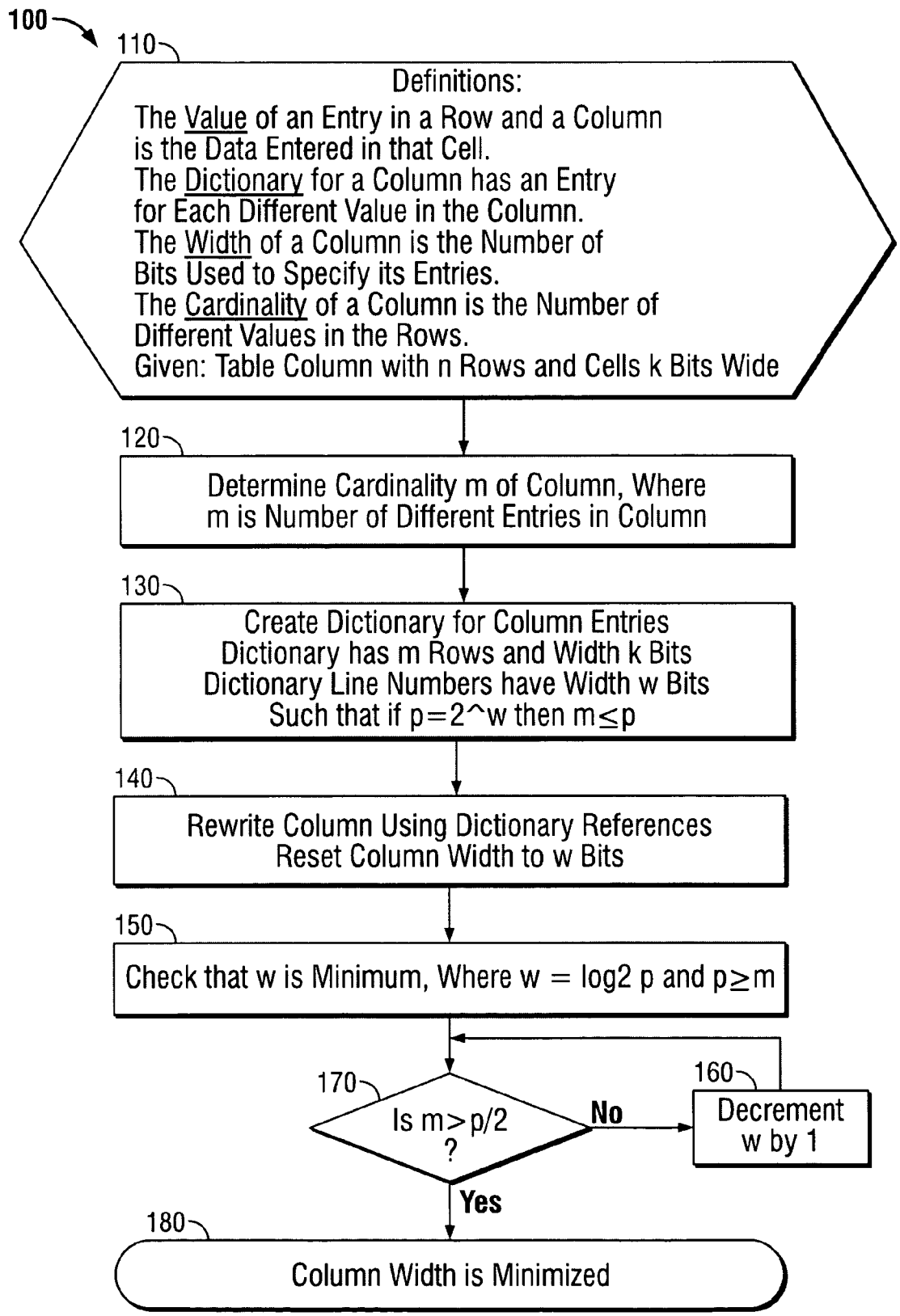
FIG. 1A shows a flow diagram for a method to minimize column width.
Figure 1B:
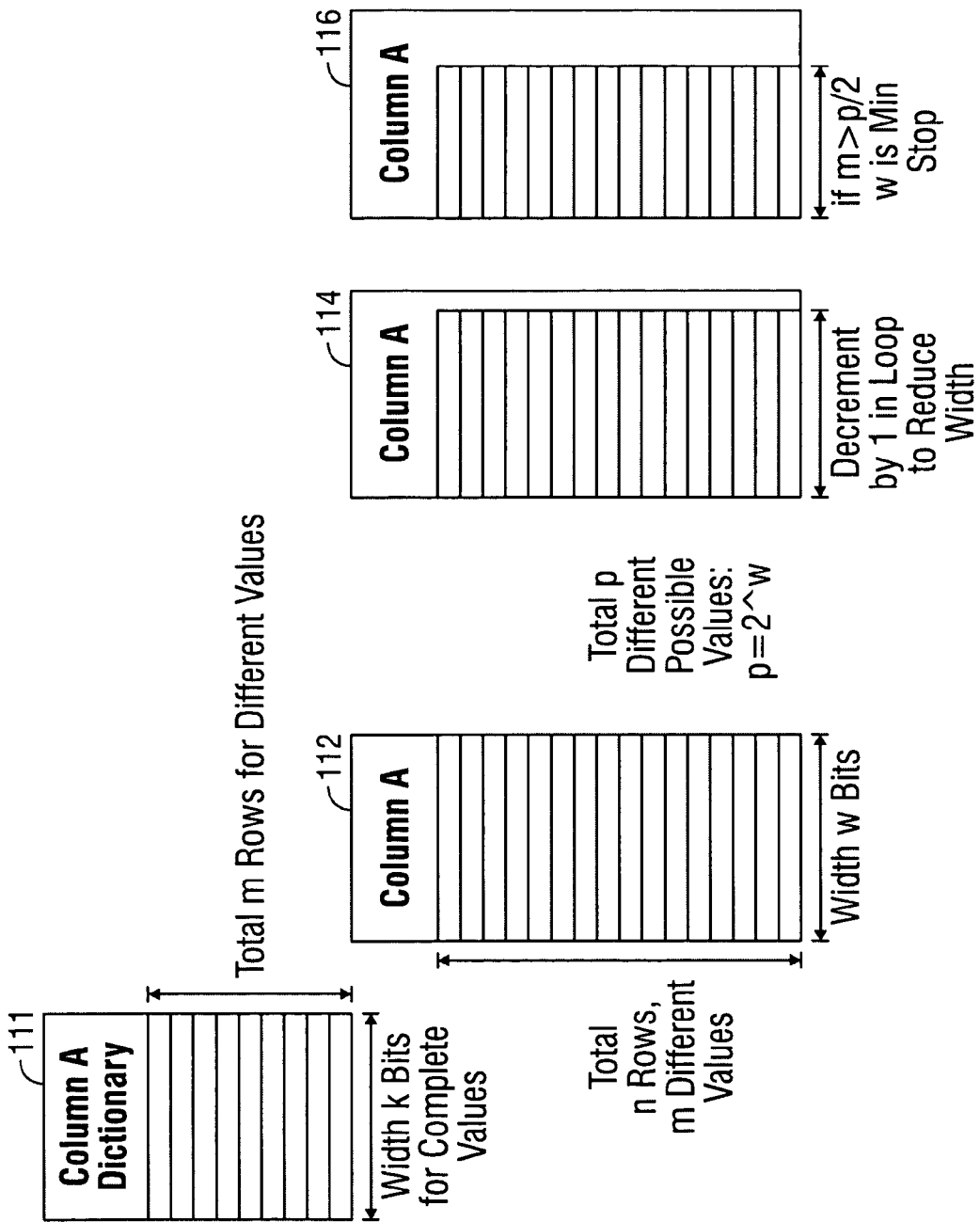
FIG. 1B illustrates the method of FIG. 1A.

FIG. 1A shows a flow diagram for a method 100 to minimize the width of a column in a table. Each table has several rows and several columns. The value of an entry in a row and a column is the data entered in that cell. Depending on the contents of the column, this method 100 can significantly reduce the memory footprint of the column. The method 100 includes writing a dictionary for the column and replacing column entries by dictionary references, which may be much shorter than the original entries. A column may have a dictionary of values. An exemplary dictionary (block 111) for Column A is shown in FIG. 1B. The dictionary for the column can have an entry for each different value in the column. The method 100 described below for combining columns can offer dictionary-based compression for the columns.

In method 100, a table has a column with n rows and cells that are each k bits wide (block 110). A cardinality of the column can be determined (block 120), in which the cardinality of the column can be defined as a total number of different values (e.g., entries) appearing in the rows of the column. The number of different entries in the column is m. Because the entries in a column may appear repeatedly in different rows in typical business applications, m may be less than n.

A dictionary may be created for the column (block 130). The dictionary can have m rows, with one row for each of the different values appearing in the column. The dictionary references (e.g., line numbers) and the respective column value entries are written in binary code, which implies that the references do not need to be longer than the longest value entry, and in many cases, can be shorter (e.g., when the value entries are text strings). The row numbers can have a width of w bits. A maximum number of different entries in the dictionary allowed by the row numbers can be represented by p, where $p=2^w$. Because the dictionary can have m entries, p can be greater than or equal to m.

The column may be rewritten using dictionary references in place of the original value entries (block 140). The column width can be reset to w (block 140). To ensure that w is set at its minimum possible value (block 150), determine whether m is greater than half of p (block 170). If m is greater than half of p, the most significant bit in the w bits used to represent the dictionary row numbers is redundant and may be deleted. Blocks 160, 170 show a loop that may be cycled through (e.g., repeated) and w may be decremented by 1 for each cycle until m is greater than half of p and w has a minimum value (e.g., wmin). The value of w is then a least integer greater than or equal to the logarithm to the base two of the cardinality m of the column (block 180).

FIG. 1B shows exemplary an exemplary column, Column A, which may be used in a business database. Column A 112 has several rows. The value of an entry in a row is the data entered in that cell. In column A 112, the values can have maximum lengths of k bits. Column A can have its own "dictionary" of values. The dictionary 110 for Column A 112 has one entry for each different value in the column. Specifically, the dictionary 110 for Column A 112 has m total rows for different values in column A, and has a width of k bits.

The width of a column in this example refers to a number of bits used to specify the entries of a column. In the method described here, Column A has a width of w bits, in which w is an integer. If p represents a number of different possible entries in column A, $p=2^w$. Column A can have cardinality m, and a value of w is such that $m \leq p$. If column A contains repeated values among its entries then m<n, and width w may be set such that p<n.

As discussed above, the relationship between p and w is $p=2^w$ or $\log_2 p=w$, and the relationship between m and w is $\log_2 m < w$. From these relations, it can be determined if m>p/2 114. Given m and w, w can be decremented in steps of 1 until m>p/2. When m reaches a point where m>p/2, w is no longer decremented 116. The resulting value of w is wmin, in which for any column with cardinality m and width w, wmin=[$\log_2 m$] (e.g., the minimum width in bits of a column is the least integer greater than or equal to the logarithm to the base two of the cardinality of the column).

Figure 2A:
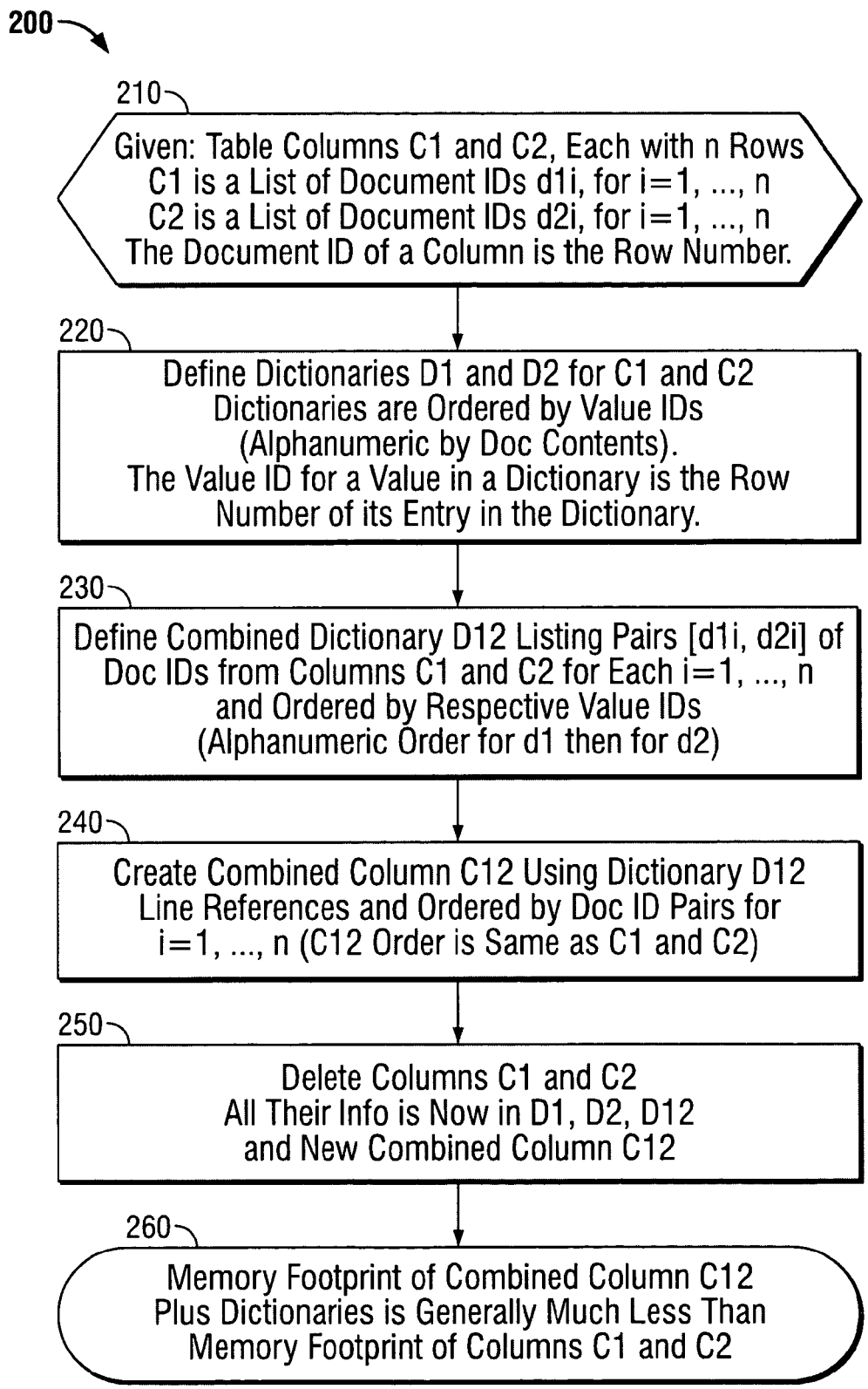
FIG. 2A shows a flow diagram for a method to combine columns.

To reduce the memory footprint still further, two or more columns can be merged pairwise. If respective values in two columns are interdependent, a second method can use this property to save memory space. FIG. 2A shows a flow diagram relating to the second method 200, and FIG. 3 shows that the second method 200 may reduce memory consumption.

To describe the implementation of the second method 200, a number of terms and relations are to be first defined (blocks 210, 220, 230). A value identifier (ID) for a value in a dictionary refers to the row number of the value's entry in the dictionary, in which the dictionary entries can be ordered alphanumerically in terms of the values from the column. A document identifier (ID) of a column entry refers to the row number of the dictionary entry corresponding to its value. When the dictionary for a column is defined, the respective values listed in the column can be replaced by their corresponding document IDs. The respective values listed in the column can be recovered by consulting the dictionary for the column. The resulting column from the merged columns can also have a column dictionary, and the respective values listed in the resulting column can be replaced by references to the column dictionary.

FIG. 2A shows a flowchart for combining columns. The original columns in the table that are to be merged are columns C1 and C2, with the table from which the columns are taken having n rows (block 210). The document IDs for C1 are labeled d1i, with integer index i running from 1 to n in steps of 1. Index i may be referred to as index j in one or more descriptions and examples below. The document IDs for C2 are labeled d2i, with integer index i running from 1 to n in steps of 1. The dictionary D1 for column C1 and the dictionary D2 for column C2 can be created on the basis of the respective columns by listing the respective different values in alphanumeric order. The respective line numbers in the dictionaries refer to the value IDs for the dictionary entries (block 220).

The combined dictionary D12 includes pairs [d1i, d2i] from document IDs d1i from column C1 and d2i from column C2, respectively, for index i running from 1 to n in steps of 1 (block 230). The pairs [d1i, d2i] are listed in an order given by their value IDs (sorting first by values referenced by doc ID d1i and then by values referenced by doc ID d2i) (block 230).

The method 200 shown in FIG. 2A includes the creation of a combined column C12 based on dictionaries D1, D2, and D12 (block 240). The combined column C12 includes a list of references d12i to the combined dictionary D12, in which the references can be ordered by index i, for i running from 1 to n in steps of 1, as in the original columns C1 and C2. To interpret the newly combined column C12, the new dictionary D12 (block 230), as well as the dictionaries D1 and D2 for columns C1 and C2 can be used. After the creation of the combined column C12, the original columns C1 and C2 are no longer required because their values are listed in their respective dictionaries D1 and D2. The respective pairs [d1i, d2i] of values from the original columns C1 and C2 (that is, the first value in each pair from column C1 and the second value in each pair from column C2, for values indexed by i running from 1 to n) are listed in dictionary D12, and the order in which the pairs appear in the original table from which the columns were taken is in the newly combined column C12. As a result, columns C1 and C2 may be deleted (block 250). The deletion of the original columns may save space in memory (block 260). In most cases involving tables containing typical business data, the memory footprint of dictionaries D1, D2, and D12 together with combined column C12 is much less than the memory footprint of the original columns C1 and C2, as shown in FIG. 3.

Figure 2B:
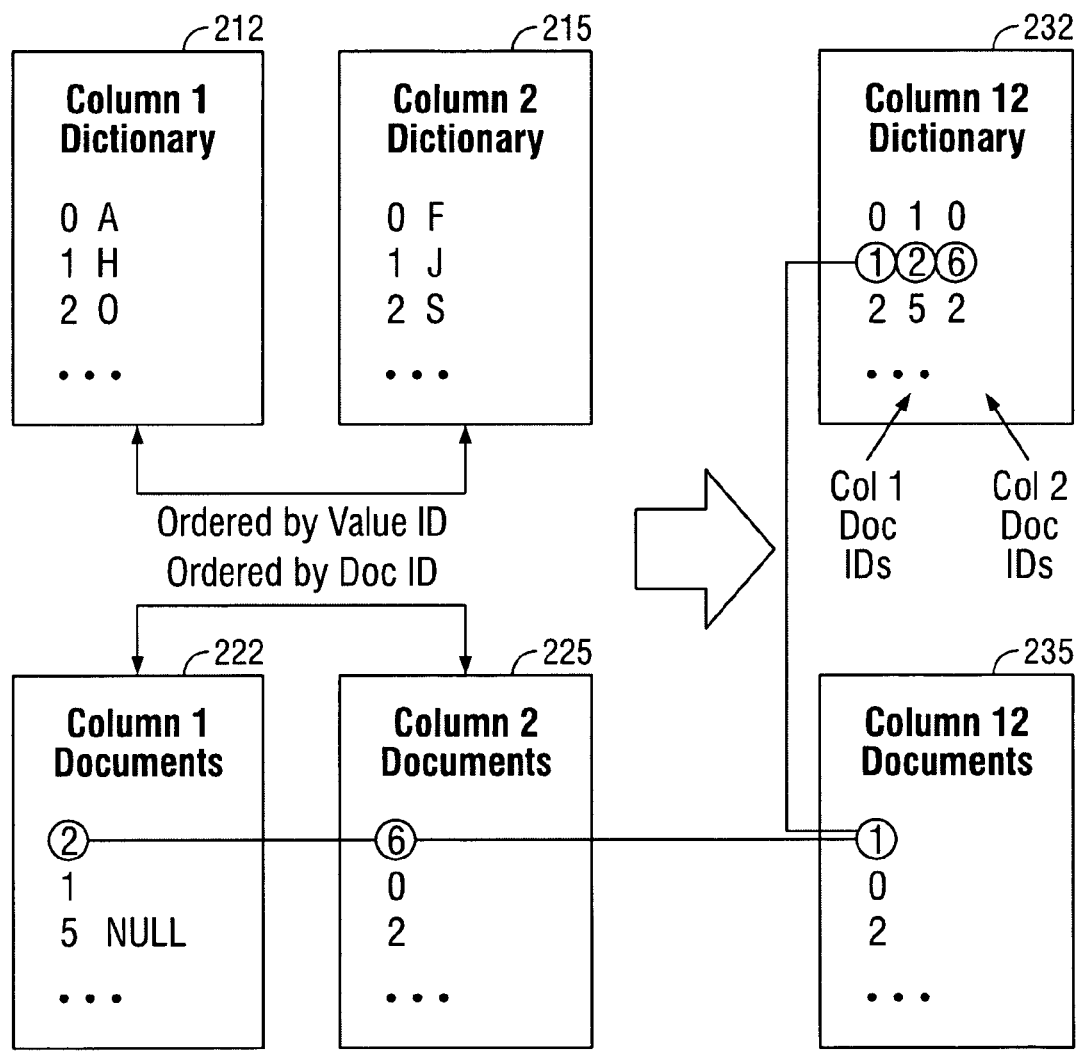
FIG. 2B illustrates the method of FIG. 2A.

FIG. 2B illustrates the method of FIG. 2A. In the second method 200, a value ID for a value in a dictionary is the row number of the value's entry in the dictionary. A document ID of a column entry is its row number in the original column (not the resulting, merged column). Exemplary dictionaries 212, 215 and documents 222, 225 of columns 1 and 2, respectively, are shown in FIG. 2B. The columns' dictionaries 212, 215 are shown in the order of the value IDs (e.g., 0, 1, 2 for Column 1 Dictionary), and the columns' documents 222, 225 are shown in the order of the document IDs (e.g., 2, 1, 5 for Column 1 Documents).

The resulting merged column can also have a column dictionary 232 and a column document 235. Given that columns 1 and 2 can have n rows and respective document IDs $d1j$ and $d2j$, for $1 \leq j \leq n$, and dictionaries 1 and 2 can list the different values appearing in columns 1 and 2, the dictionary and the document for the combined column 12 can be defined. The dictionary for combined column 12 can list value IDs as pairs [d1j, d2j], for $1 \leq j \leq n$, in which document IDs d1j and d2j can be from row j in columns 1 and 2, respectively. The document list for combined column 12 can have entries d12j, for $1 \leq j \leq n$, in which each entry can provide an appropriate dictionary entry [d1j, d2j] for row j in columns 1 and 2. The dictionary may be sorted by value ID—so, in general, pair j is not in dictionary row j.

To interpret the new hybrid column 12, the new dictionary 12 (232) as well as the dictionaries for columns 1 and 2 are required (212, 215). When the columns are merged, all the information from columns 1 and 2 is in column 12 and its dictionary, so columns 1 and 2 can be deleted from memory. As a result, column 12 and its new dictionary generally require less space in memory than column 1 and column 2 individually.

FIG. 3 illustrates how to calculate the memory required to store columns C1, C2, C12, and dictionaries D1, D2, D12. A notation key 301 is shown for the parameters described below. The memory required for column C1 is n times the column width w1 in bits, in which n is the number of rows in the column. The memory required for column C2 is n multiplied by the column width w2 in bits, in which n is the number of rows in the column. The memory required for dictionary D1 is m1 multiplied by k1, where m1 is the cardinality of column C1 and k1 is the width in bits of the widest value in column C1. The memory required for dictionary D2 is m2 multiplied by k2, in which m2 is the cardinality of column C2 and k2 is the width in bits of the widest value in column C2. The memory requirements for the combined column C12 and dictionary D12 can be calculated from the above values as shown in FIG. 3.

The memory required for the combined column C12 and dictionary D12 can vary depending on any functional interdependency between corresponding values d1i and d2i in the two original columns C1 and C2. If there is a functional interdependency between the respective column values (e.g., if the values d1i in C1 and d2i in C2 are correlated such that there is a function F from C1 to C2 such that F(d1i)=d2i for all i from 1 to n, and any given values always appear together), the dictionary length is only mm and the number of bits required to store the dictionary row numbers is only wm. In the worst case, in which there are no such functional intedependencies, the space required for the combined column C12 is the same as the space required for the two separate columns C1 and C2, and the space required for the combined dictionary D12 may be large to accommodate all of the different combinations of values from columns C1 and C2. In the best case, in which there is complete functional interdependency between columns C1 and C2, the space required for the combined column C12 is the same as that required for the larger of the two original columns, and the space required for the combined dictionary D12 is less than that required for either of the original dictionaries. In practice, in many cases, the total memory required for column C12 and the dictionaries D1, D2, and D12 may be much less than the space required for the original columns.

The information generated from a business may be generated by a program or an automated process. For instance, a business may have a program to automatically generate results for the first and/or second methods described above. In some cases, the automatically generated results and elimination of redundant data can lead to greater available memory space in one or more computers. The automation features of the implemented methods can simplify the business' task of data management and storage. The elimination of redundant data can also lead to more efficient data searches, and reduce the business' rate of purchasing additional equipment for data processing, management, and storage.

As used herein, the terms "electronic document" and "document" mean a set of electronic data, including both electronic data stored in a file and electronic data received over a network. An electronic document does not necessarily, but may, correspond to a file. A document may be stored in a portion of a file that holds other documents, in a single file dedicated to the document in question, or in a set of coordinated files. The term "object" may refer to information sources such as documents, reports, presentations, files and directories.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), a wireless local area network (WLAN), a personal area network (PAN), a mobile communication network using a multiple access technology (e.g., a cellular phone network with code division multiple access, CDMA), and the Internet.

The computing system can include clients and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Nevertheless, it will be understood that various modifications may be made without departing from the spirit and scope of the claims below. For example, the variables and terms listed in FIGS. 1A and 2A may include other variables and terms for specific columns. Accordingly, other implementations are within the scope of the following claims.

What is claimed is:

1. A computer-implemented method of reducing a memory footprint of a database table having a plurality of rows and one or more columns, wherein each of the one or more columns has a cardinality, and wherein the cardinality is a total number of different values in the rows of each column, the method comprising:
   comparing the cardinality of at least one of the one or more columns with a total number of possible values of the cells in the rows of the at least one column based on a width of the at least one column; and
   reducing the width of the at least one column when the cardinality is less than a threshold based on the total number of possible values in the rows of the at least one column, the threshold is a least integer greater than or equal to the logarithm to the base two of the cardinality of the column.

2. A computer-implemented method in accordance with claim 1, wherein a value of an entry in a row and a column comprises a data entry in a cell, wherein the column in the table has a maximum value length of k bits.

3. A computer-implemented method in accordance with claim 2, wherein a dictionary for the column has an entry for each different value in the column, wherein the dictionary for the column comprises a width of k bits.

4. A computer-implemented method in accordance with claim 3, wherein the width of the column comprises a number of bits used to specify column entries, wherein the column comprises a width of w bits, wherein w is an integer, wherein a value of w determines a number of different values in the column, wherein p is the number of different possible entries in the column, and wherein $p=2^w$.

5. A computer-implemented method in accordance with claim 4, wherein the cardinality of the column comprises a number of different values in the column, wherein the table comprises n rows, wherein the column comprises m different values and has cardinality m, and wherein the value of w is such that $m \leq p$, and if the column has repeated entry values then $m<n$.

6. A computer-implemented method in accordance with claim 5, wherein $\log_2 p = w$ and $\log_2 m < w$.

7. A computer-implemented method in accordance with claim 5, further comprising:
   rewriting the column with one or more dictionary references; and
   resetting the column width to w.

8. A computer-implemented method in accordance with claim 7, further comprising:
   decrementing w in increments of 1 as long as $m<p/2$; and
   setting a value of w to wmin when decrementing ceases, wherein wmin is the least integer greater than or equal to $\log_2 m$ for a column with cardinality m and width w.

9. A computer-implemented method of reducing a memory footprint of a database table having a plurality of rows and one or more columns, wherein each of the one or more columns has a cardinality, and wherein the cardinality is a total number of different values in the rows of each column, the method comprising:
   comparing the cardinality of at least one of the one or more columns with a total number of possible values of the cells in the rows of the at least one column based on a width of the at least one column;
   reducing the width of the at least one column when the cardinality is less than a threshold based on the total number of possible values in the rows of the at least one column;
   writing a dictionary for the at least one column, wherein the dictionary references the at least one column entries, and wherein the dictionary comprises one row for each of the different values in the at least one column; and
   replacing column values by the dictionary references, wherein the dictionary comprises m rows, and wherein each row comprises a width of w bits.

10. An article comprising a machine-readable medium storing instructions operable to cause a machine to perform operations comprising:
   reducing a memory footprint of a database table having a plurality of rows and one or more columns, wherein each of the one or more columns has a cardinality, and wherein the cardinality is a total number of different values in the rows of each column, the reducing comprising:
   comparing the cardinality of at least one of the one or more columns with a total number of possible values in the rows of the at least one column based on a width of the at least one column, the threshold is a least integer greater than or equal to the logarithm to the base two of the cardinality of the column; and
   reducing the width of the at least one column when the cardinality is less than a threshold based on the total number of possible values in the rows of the at least one column.

* * * * *